(12) United States Patent
Slachmuylders

(10) Patent No.: US 11,028,816 B2
(45) Date of Patent: Jun. 8, 2021

(54) GRAVITATIONAL VORTEX WATER TURBINE ASSEMBLY

(71) Applicant: TURBULENT BVBA, Leuven (BE)

(72) Inventor: Geert Slachmuylders, Duffel (BE)

(73) Assignee: TURBULENT BVBA, Leuven (BE)

( * ) Notice: Subject to any disclaimer, the term of this patent is extended or adjusted under 35 U.S.C. 154(b) by 88 days.

(21) Appl. No.: 16/060,603

(22) PCT Filed: Dec. 8, 2016

(86) PCT No.: PCT/EP2016/080349
§ 371 (c)(1),
(2) Date: Jun. 8, 2018

(87) PCT Pub. No.: WO2017/097943
PCT Pub. Date: Jun. 15, 2017

(65) Prior Publication Data
US 2018/0372059 A1  Dec. 27, 2018

(30) Foreign Application Priority Data

Dec. 8, 2015  (BE) .................................. 2015/5797

(51) Int. Cl.
*F03B 3/18*  (2006.01)
*F03B 3/12*  (2006.01)
(Continued)

(52) U.S. Cl.
CPC .............. *F03B 3/186* (2013.01); *F03B 3/121* (2013.01); *F03B 13/10* (2013.01); *F03B 17/062* (2013.01);
(Continued)

(58) Field of Classification Search
CPC ........ F03B 3/186; F03B 17/062; F03B 3/121; Y02E 10/223; F05B 2250/315; F05B 2250/15; F05B 2240/132
(Continued)

(56) References Cited

U.S. PATENT DOCUMENTS 1,504,776 A * 8/1924 Nagler ................... F03B 11/00
415/169.1
1,548,341 A * 8/1925 Banki ....................... F03B 3/00
415/53.3
(Continued)

FOREIGN PATENT DOCUMENTS

AT        412363 B    1/2005
CH        699133 B1   1/2012
(Continued)

OTHER PUBLICATIONS

Office Action from corresponding CN Application No. 2016800714668, dated Sep. 10, 2019.
(Continued)

*Primary Examiner* — J. Todd Newton
(74) *Attorney, Agent, or Firm* — Workman Nydegger

(57) ABSTRACT

A gravitational vortex water turbine assembly is described wherein the water turbine is disposed below the bottom of the basin in which the vortex is induced. Preferably, the basin comprises a spiral-shaped side wall and the rotor blades of the turbine rotor are dimensioned such that they absorb the tangential, axial and radial component of the water flow of the vortex.

14 Claims, 7 Drawing Sheets

(51) Int. Cl.
*F03B 13/10* (2006.01)
*F03B 17/06* (2006.01)

(52) U.S. Cl.
CPC ..... *F05B 2240/132* (2013.01); *F05B 2250/15* (2013.01); *F05B 2250/315* (2013.01); *Y02E 10/20* (2013.01)

(58) Field of Classification Search
USPC .................................................. 415/4.2, 3.1
See application file for complete search history.

(56) References Cited

U.S. PATENT DOCUMENTS

| | | | | |
|---|---|---|---|---|
| 2,041,570 | A | | 5/1936 | Reiffenstein |
| 3,372,905 | A | * | 3/1968 | Brown ...................... F03B 1/00 60/327 |
| 4,076,448 | A | * | 2/1978 | Sanders, Jr. .............. F03B 3/00 415/184 |
| 4,416,584 | A | * | 11/1983 | Norquest .............. F03B 17/062 415/184 |
| 5,921,745 | A | * | 7/1999 | Round ...................... F03B 3/00 415/122.1 |
| 6,948,910 | B2 | * | 9/2005 | Polacsek ............... F03D 1/0608 416/1 |
| 7,559,742 | B2 | * | 7/2009 | Inoue .................. F04D 29/4213 415/184 |
| 8,354,758 | B1 | * | 1/2013 | Boschma .............. F03B 17/065 290/43 |
| 2003/0099544 | A1 | * | 5/2003 | Brekke .................... F03B 3/02 415/204 |
| 2012/0128496 | A1 | * | 5/2012 | Abramov ................. E03B 3/28 416/175 |
| 2013/0022456 | A1 | | 1/2013 | Lehoczky |
| 2015/0159619 | A1 | | 6/2015 | Manshanden |
| 2015/0233340 | A1 | * | 8/2015 | Levi ....................... F03B 13/06 405/76 |

FOREIGN PATENT DOCUMENTS

| | | | | |
|---|---|---|---|---|
| CN | 103912435 | A | | 7/2014 |
| CN | 107806390 | A | * | 3/2018 ............... F03B 3/18 |
| CN | 109854439 | A | * | 6/2019 |
| WO | 2004061295 | A2 | | 7/2004 |
| WO | 2015017881 | A1 | | 2/2015 |
| WO | WO-2017097943 | A1 | * | 6/2017 ............ F03B 17/062 |

OTHER PUBLICATIONS

Belgian Search Report from BE Application No. BE 201505797, dated Aug. 9, 2016.
International Search Report from PCT Application No. PCT/EP2016/080349, dated Feb. 27, 2017.

* cited by examiner

GRAVITATIONAL VORTEX WATER TURBINE ASSEMBLY

FIELD OF THE INVENTION

The invention relates to a water turbine for converting kinetic and potential energy from a water flow into mechanical force, and subsequently into electrical energy through a generator. It concerns in particular a gravitational vortex water turbine assembly, wherein the energy is converted from a vortex which is formed by the water flow under the influence of gravity.

STATE OF THE ART

Such gravitational vortex water turbine assembly is, for example, known from WO2004/061295. The vortex water turbine assembly includes a rectangular basin surrounded by four side walls, with an inflow opening in one of said side walls. The basin further includes a horizontal bottom with a round, central outflow opening for inducing a stable vortex in the water flow under the influence of gravity. A water turbine is mounted in the basin coaxially with the vortex. The water turbine comprises a turbine rotor having vertical turbine blades. The tangential component of the water flow of the vortex acts on these turbine blades, causing them to rotate. The water flow of the vortex further flows ring-shaped, axially downwards through the turbine rotor. The water turbine is, for example, coupled to an electrical generator and to subsequently generate electrical energy.

Such a gravitational vortex water turbine assembly is beneficial in situations where the height difference in the water flow is too low for some other types of water turbine assemblies to work efficiently. The gravitational water vortex turbine makes use of the energy that is accumulated in the vortex under the influence of gravity and is therefore less dependent on the kinetic and/or potential energy which is present in the source of the water flow.

A similar gravitational vortex water turbine assembly is furthermore also known from WO2015/017881. In order to stimulate the efficient formation of a vortex, this water gravitational vortex turbine assembly comprises a cylindrical basin, which is, for example, provided with side walls with spiral fins. Furthermore, also an inflow channel and an inflow opening is provided in the side wall of the basin which substantially tangentially supplies the water flow near the side wall of the cylindrical basin so as to achieve a more efficient formation of a vortex.

It is clear that further water turbine assemblies are known from for example U.S. Pat. Nos. 4,076,448, 5,921,745, US2015/233340, AT412363B, CH699133B1, US2013/022456. Most of these systems make use of intermediate guide vanes which extend in and/or upstream and/or downstream of the inlet opening of the basin. These intermediate guide vanes increase viscous losses thereby reducing efficiency of the turbine assembly, reduce robustness of the turbine assembly against debris and reduce fish friendliness.

There continues to exist a need to further optimize such a gravitational vortex water turbine assembly. It is an object to realize a larger electrical power without the need for a higher flow rate, larger height difference and a larger installation for the gravitational vortex water turbine assembly.

SUMMARY OF THE INVENTION

For this object, according to a first aspect of the invention, there is provided a gravitational vortex water turbine assembly, comprising:

- a spiral-shaped vortex basin configured to induce a vortex in a water flow under the influence of gravity, having a substantially vertical central axis, the vortex basin comprising a side wall with a tangential inflow opening for supplying the water flow to the vortex and a bottom with a central outflow opening for discharging the water flow of the vortex,
- a water turbine, disposed under the basin, coaxially with the central axis of the vortex, comprising a turbine housing, coupled to the central outflow opening and a turbine rotor,
- wherein the turbine rotor comprises a central rotor hub and rotor blades attached thereon, and
- wherein the rotor blades:
  - at an upstream end have a smaller angle relative to the central axis than the angle at the downstream end;
  - at a radially inward end have a larger angle relative to a plane according to the central axis than at a radially outward end; and
  - at a radially inward end have a smaller angle relative to a plane perpendicular to the central axis than at a radially outward end,
  - such that the rotor blades are configured to absorb the tangential, axial and radial component of the water flow of the vortex.

It is clear that the central outflow opening is situated at the centre point of the spiral-shaped vortex basin. The central outflow opening thereby comprises, for example, a substantially circular cross section of which the central point substantially corresponds to the centre point of the spiral-shaped vortex basin, as well as the central axis of the induced vortex. In this manner, the water flow with which the vortex is formed in the basin, is processed more efficiently, such that the maximum flow rate to flow through the turbine can be increased. Since the water turbine is no longer positioned in the basin, but underneath the basin, the formation of the vortex in the basin can be accomplished in a consistent manner, without any impact of the water turbine, and is the vortex used as a means to create additional height difference over the turbine. By positioning the rotor at this place, full use is also made of the tangential as well as the axial and radial velocity.

As will be explained further, this means, for embodiments wherein the water turbine assembly makes use of a diffuser, that the turbine rotor is disposed in a turbine housing which forms the transition between the basin and this diffuser. Furthermore, it is also clear that the inflow opening is located at the wider end of the geometrical progression of the spiral-shaped side wall of the basin. Additionally, the spiral shape of the basin ensures a more efficient and stable formation of the vortex in the basin. In order to stimulate the efficient formation of a vortex, the gravitational vortex water turbine assembly can have a basin having a spiral shape which substantially corresponds with an Archimedes spiral or a logarithmic spiral, such as, for example, a Fibonacci spiral or a Bernoulli spiral. The origin, or the centre point of this spiral shape is then situated preferably near the outflow opening in the bottom of the basin. Preferably, the side walls of the basin are for the most part arranged vertically, which allows for a simple production. Near the bottom of the basin, the side walls may preferably be transitioned into the bottom of the basin by means of a rounding as, in this manner, this will achieve a good conduction of the flow of liquid and will also allow, in the event that a mould is used in the production of the basin, to obtain a good release of this mould.

In this manner, the gravitational water vortex turbine can fully make use of the vortex to create, already at low height difference, a uniform flow of liquid wherein the energy can be extracted at high efficiency. In this manner, a larger and slower, rotating liquid flow is advantageously, relative to alternative types of water turbine assemblies, gradually accelerated to the centre of the vortex and towards the outflow opening. The positioning of the water turbine beneath the outflow opening, and the accompanying occurred acceleration of the water flow also allows the use of smaller turbine rotors. Furthermore, this principle also brings the speed of rotation of the turbine rotor to a high enough speed to use a cheaper generator. However, this can be done in an ecologically and environmental friendly manner, as the relative speed difference between the water flow in the vortex, as well as all the debris and animals in this flow of liquid, and the turbine rotor of the water turbine is limited. Both namely rotate more or less synchronized around the centre point of the vortex.

It is thus clear that the vortex water turbine differs from prior art system as it comprises a turbine which cannot be classified as a pure impulse turbine, nor as a pure reaction turbine, but comprises a turbine which is able to make use of all force components of the vortex as identified above and which is able to make use of the pressure difference developed by the turbine assembly between the inlet and the outlet. In this way the turbine assembly enables a reduction of the dimensions of the assembly and an increase in efficiency at a larger flow rate for a predetermined height difference of the water flow, thereby leading to a reduced installation cost and complexity for a predetermined power rating. This is especially advantageous when the vortex water turbine assembly is applied at locations where there is a relatively large ratio between the flow rate and the height difference of the flow. It is further clear that the energy potential of such a water turbine assembly is larger. Due to the dimensioning of the impeller hub it is ensured that a pressure drop can be realized over the impeller height in order to obtain a further energy gain from this pressure difference. As a result, the turbine is functioning well in an environment with a free outlet, as well as in an environment in which the outlet is located below the downstream water level. Also, the impeller design makes it possible to send flow & head via the impeller speed for optimal energy production. Further the use of an outlet below the downstream water level allows for an increased use of the acceleration of the water flow and the use of the pressure difference over the turbine, thereby allowing for a turbine rotor with smaller dimensions.

According to an embodiment the water turbine includes an electrical generator, or the water turbine is coupled to an electrical generator for generating electrical energy. It goes without saying that also alternative embodiments are conceivable, wherein the water turbine is also used for a mechanical drive of all kinds of devices, such as, for example, a mechanical drive of a water purification plant.

According to an embodiment, a water turbine assembly is provided, characterized in that the side wall extends downstream around the central axis from a first side up to an opposite second side of the inflow opening, wherein the distance between the side wall and the central axis thereby decreases from a maximum radius near the first side to a minimum radius near the second side according to a downstream direction.

This form of the side wall of the basin ensures an increase in efficiency of the gravitational vortex water turbine assembly as it induces a vortex in a more efficient manner than, for example, a basin with a cylindrical side wall. It is clear that the spiral-shaped side wall thereby extends substantially completely around the central axis, for example, by an angle in the range of 330° to 390°. It is clear that in assistance for interpretation of the feature that the side wall extends downstream around the central axis this could also be thought of as for example the side wall unwinding around the central axis.

It is further clear that the decrease in the distance between the side wall and the central axis according to some embodiments could be continuous, however it is clear that alternative embodiments in which a more discrete decrease is realised are also possible, for example in which this distance is decreased for a plurality of intervals of the side wall, for example intervals of the side wall which extend around the central axis over a respective angle in the range of 30° to 180°, for example 90°, and in which for example each of these intervals of the side wall comprises a section with a predetermined constant bending radius. This thus means for example a side wall with two, three, four, five, . . . such intervals of the side wall, each of these intervals comprising a predetermined constant bending radius, in which the constant bending radius of a subsequent downstream interval is smaller than the preceding upstream interval. It is clear that variations are possible in which each of the intervals comprise a substantially constant bending radius, which remains within a predetermined tolerance of for example 2% to 15% of a predetermined average, median or mean predetermined bending radius for this respective interval of the side wall. Such embodiments are particularly advantageous when combined with an embodiment in which the side wall comprises a plurality of segments. Each of these segments then comprising such a respective predetermined bending radius, such that when assembled a subsequent downstream segment of the side wall comprises a corresponding predetermined bending radius which is smaller than that of a preceding upstream segment of the side wall. It should further be clear that such a side wall comprising such intervals and/or segments as described above, could in general be useful when comprised in any suitable gravitational vortex water turbine assembly comprising a spiral-shaped vortex basin configured to induce a vortex in a water flow under the influence of gravity, having a substantially vertical central axis, the vortex basin comprising a side wall with a tangential inflow opening for supplying the water flow to the vortex and a bottom with a central outflow opening for discharging the water flow of the vortex. This thus means irrespective of the specific configuration and positioning of for example turbine rotor assembly of the water turbine assembly, etc. As this leads to clear advantageous with respect to the production and transport of such a side wall of the turbine assembly.

According to a further embodiment, a water turbine assembly is provided, characterized in that the minimum radius is in the range of 50% to 85% of the maximum radius.

This decrease of the side wall of the spiral-shaped basin ensures that the incoming water flow flows into the vortex in an optimum manner through the inflow opening in the substantially spiral-shaped basin. It is thereby understood that the incoming water flow flows preferably substantially tangentially to the spiral-shaped basin through the inflow opening in the side wall. That is to say, in a way the water flow near the inflow opening follows the inner wall of the side wall, for example at an angle in the range of 0° to 20°, relative to the plane of the side wall.

According to a further embodiment, a water turbine assembly is provided, characterized in that the course of the distance of the sidewall to the central axis between the maximum radius and the minimum radius occurs according to:

a logarithmic spiral; or an Archimedes spiral.

The logarithmic spiral can be carried out, for example as a Fibonacci spiral or a Bernoulli spiral. Alternative embodiments are possible, such as for example a plurality of sequential arcs comprising a decreasing arc radius.

Such a shape increases the maximum flow rate which can flow through the water turbine assembly and the efficiency with which the vortex is induced. Moreover, this also allows to dimension the course of the shape of the side wall in a simple manner since the shape of the side wall is almost equivalent to a simple, mathematically defined spiral shape. It is clear this effect is caused by the impeller and impeller hub design in addition to the shape of the basin.

According to a further embodiment, a water turbine assembly is provided, characterized in that the side wall includes a plurality of segments. According to further embodiments these segments comprise a different diameter, such as described in more detail below.

The use of segments allows for easy transport of the basin after which the predefined shape of the basin can be installed at the site as a kind of prefab construction. This allows to ensure the desired shape of the basin with greater precision and allows a more efficient installation. We define the shape before we are going to install. In this manner, a side wall can be produced of which the shape can be adjusted afterwards during the installation according to specific parameters of the water flow, such as, for example, the flow rate, the height difference, etc., as these parameters of the river, for example, would change substantially.

According to a further embodiment, a water turbine assembly is provided, characterized in that the central outflow opening of the bottom has a radius which is smaller than or equal to the minimum radius of the side wall; and the inner radius of the turbine housing, near the turbine rotor, is in the range of 20% to 45% of the maximum radius of the side wall.

In this manner, the portion of the vortex with a maximum angular velocity is enlarged near the outflow opening, and subsequently in the water turbine which is connected to this outflow opening. If you move from the outside to the inside along the radius of the vortex, then the vortex speed will first increase exponentially, and after reaching a maximum speed will then decrease linearly to zero in the absolute centre point of the vortex near the central axis. Alternatively, such a vortex thus comprises a core zone, in which the angular velocity of the water flow increases linearly up to a certain maximum angular velocity at an increase of the distance to the central axis, after which, outside of this core zone, the angular velocity decreases again with an increase of the distance to the central axis. With such a range for the radius of the central outflow opening and the adjoining inner wall of the turbine housing, the portion of the core zone of this vortex is maximized near the turbine rotor. A limited exceeding of the core zone, for example with a maximum of 20%, may be desirable, but a too great exceeding results in a water flow with a decreasing angular speed which adversely affects the efficiency of the turbine rotor. It is further clear that preferably also the central part of the vortex is not covered by the impeller, such that this low speed part does not reduce the average speed of the vortex acting on the impeller blades as described in further detail below with respect to FIG. 19.

According to a further embodiment, a water turbine assembly is provided, characterized in that the downstream end of the turbine housing comprises a diffuser configured to guide the water flow flowing in a direction having a component radially away from the central axis.

In this manner, the diffuser ensures that near the outflow opening of the housing of the water turbine there is less risk of a turbulent disturbance of the flow in the water turbine itself. Moreover, such a diffuser creates a certain degree of axial counter-pressure in the water turbine such that the risk of cavitation is reduced. Such a radial diffuser also allows for the diffuser, and therefore also the associated water turbine, to be kept compact with regard to the build-in depth. Finally, such a radial diffuser also facilitates the production, since the diffuser can be produced with two simple shapes that only during the installation have to be joined together.

According to a further embodiment, a water turbine assembly is provided, characterized in that the diffuser is further configured to guide the water flow from a lowest position back upwards.

In this manner, a constant and higher axial counter pressure is created that reduces the risk of cavitation, as well as reduces a turbulent disturbance of the flow in the water turbine. Furthermore, such an embodiment also ensures that, even when the outflow opening of the water turbine would be located above the water surface, the risk is reduced that an airflow would mix with the water flow through this outflow opening of the water turbine, which would reduce the efficient operation of the water turbine.

According to a further embodiment, a water turbine assembly is provided, characterized in that the water turbine is positioned at its downstream end under the water surface.

In this manner, the pressure in the water flow near the water turbine is maintained and there is no risk that an air stream mixes with the outflowing water.

According to a further embodiment, a water turbine assembly is provided, characterized in that the turbine rotor comprises a central rotor hub and rotor blades attached thereon, wherein the number of rotor blades is in the range of two to ten, inclusive.

A limited number of rotor blades as well as a corresponding greater distance between the rotor blades ensures that the water turbine is fish-friendly and less susceptible to interference by dirt or silting. Preferably, the turbine rotor also rotates at a relatively low speed, such as, for example 300 revolutions per minute or less, for example 100 revolutions per minute or less.

According to a further embodiment, a water turbine assembly is provided, characterized in that the rotor blades are configured such that they absorb the tangential, axial and radial component of the water flow of the vortex. Additionally a pressure difference is created between the turbine inlet and outlet which allows for an increased level of energy which can be extracted from the flow.

It is clear that the rotor blades of the water turbine are mounted on a rotatable central hub, which is coaxially mounted with the central axis of the vortex. This means that the axis of rotation of the hub of the turbine rotor substantially coincides with the central axis of the vortex. The axis of rotation of the turbine rotor is substantially vertical.

Known gravitational vortex water turbine assemblies, wherein the turbine rotor is positioned in the basin, make use of vertical rotor blades. In this manner, only the tangential component of the water flow of the vortex is captured by the rotor blades. The axial and radial component of the water flow of the vortex is not disturbed by such known systems to minimize the risk that the vortex in the basin is disturbed.

This embodiment, wherein the water turbine is positioned under the outflow opening in the bottom of the basin, allows to capture all of the components of the water flow of the vortex near the water turbine, without the risk that the vortex is disturbed in the basin. This allows a greater efficiency of energy to be extracted from the water flow by the turbine rotor.

According to a further embodiment, a water turbine assembly is provided, characterized in that the rotor blades:

at an upstream end have a smaller angle relative to the central axis than the angle at the downstream end;

at a radially inward end have a larger angle relative to a plane according to the central axis than at a radially outward end; and at a radially inward end have a smaller angle relative to a plane perpendicular to the central axis than at a radially outward end.

In this manner, rotor blades can be realized which absorb both the tangential, axial, and the radial component of the water flow of the vortex.

According to a further embodiment, a water turbine assembly is provided, characterized in that the angle relative to the central axis at the upstream end is in the range of 0° to 45°, and in that the angle at the downstream end is in the range of 45° to 80°.

Preferably, these angles, at the rotational speed of the rotor for an optimal load of an associated generator, are substantially transverse to the tangential, radial and axial angles of the velocity vector of the water flow, such that an optimum impact of the water flow on the turbine blades is realized.

According to a further embodiment, a water turbine assembly is provided, characterized in that the maximum radius is in the range of 1.5 m to 10 m, inclusive. The maximum radius of the outflow opening in the bottom of the basin, as well as the turbine housing, is preferably in the range of 0.5 m to 3 m.

Such a water turbine assembly is compact and can be installed without major activities in, next to or in the vicinity of an existing watercourse.

According to a further embodiment, a water turbine assembly is provided, characterized in that the water turbine assembly further includes:

an electrical generator, coupled to the water turbine, or mounted in the water turbine;

a control unit, coupled to the generator, wherein the control unit is configured to control the rotational speed and the load of the generator and the therewith coupled turbine rotor of the water turbine during operation such that a Maximum Power Point Tracking Control is achieved.

In this manner, the electrical power which can be generated through the water turbine assembly can be maximized by optimizing the rotational speed and the load of the turbine rotor by the control unit of the electrical generator.

According to a further embodiment, a water turbine assembly is provided, characterized in that the water turbine assembly further includes:

an electrical generator, coupled to the water turbine, or mounted in the water turbine;

a control unit, coupled to the generator, configured to control the rotational speed and the load of the generator and to control the coupled turbine motor of the water turbine during operation such that a relative maximum velocity difference between the turbine blades and the water flow in the vortex does not exceed a predetermined maximum value.

In this manner, a fish-friendly water turbine assembly is realized with a minimal environmental impact, which reduces the need to provide for additional measures in order to prevent, for example, that fish swim into the water turbine, or in order to make it possible for fish to migrate past the water turbine.

According to a further embodiment, there is provided a water turbine assembly, wherein the number of rotor blades is in the range of two to ten, inclusive.

According to a further embodiment, there is provided a water turbine assembly, wherein: the radius of the turbine central rotor hub is larger than a predetermined minimum radius, the minimum radius being determined:

as a percentage in the range of at least 10%, for example in the range of 15% to 50%, for example in the range of 20%-30%, of the radius of the turbine rotor and/or of the turbine rotor housing;

as a percentage in the range of 10% to 65%, for example in the range of 15% to 50%, for example of the radius of the forced vortex zone of the vortex; and/or such that the rotor blades cover an annular section around the central axis of the vortex which does not exceed the core zone of the vortex by more than 25%, and preferably does not exceed the core zone of the vortex by more than 20%;

the water turbine assembly further comprises an outlet, which is located below the water surface and is directed downstream;

the radius of the turbine housing is smaller than the maximum radius of the central outflow opening, and preferably the transition between the turbine housing and the central outflow opening comprises a curved shape, such as for example a conical shape or hyperbolical shape with a rounded transition to straight ends; and/or the turbine rotor comprises a radially outward cylindrical shroud coupled to the rotor blades, such that the cylindrical shroud is rotated coaxially with the rotor blades during rotation of the turbine rotor.

According to a further embodiment, there is provided a water turbine assembly according to one or more of the claims 2 to 13, wherein:

the side wall comprises a movable section at the second side of the inlet 210, configured to allow for a modification of the distance between the second side of the inlet and the central axis of the turbine rotor, such that the alignment of the central axis of the turbine rotor and central axis of the vortex is modified, preferably such that the alignment of the central axis of the turbine rotor and the central axis of the vortex is increased; and/or no intermediate guide vanes are positioned in or upstream of the inlet opening.

Several of these embodiments allow for an improved stabilizing and alignment of the central axis of the vortex with the central axis of the turbine rotor, thereby increasing efficiency of the rotor, reducing wear and aging effects on the components of the water turbine assembly. This further increases the flow rate and lowers the viscous losses in the free vortex in the basin, see for example FIG. 17 versus the prior art solution of FIG. 18, in which it is clear that the flow of a Taylor vortex 21 of FIG. 17 causes less viscous losses than that shown in FIG. 18 for the prior art solution without a conical transition between the outlet opening and the turbine housing. Such a shroud for example allows for a larger rigidity of the rotor, reducing undesired losses due to vibrations and an increased efficiency of the turbine assembly.

According to a second aspect of the invention, a method for the manufacture of a turbine rotor for use in a water turbine assembly is provided according to the first aspect of the invention, characterized in that the method comprises the following steps:

simulation of the vortex on the basis of the turbine assembly; determination of the axial, tangential and radial components of the vortex near the water turbine; automatic generation of a shape for the rotor blades on the basis of the axial, tangential and radial components of the vortex such that a minimum boundary layer separation occurs near the rotor blades;

manufacturing the generated shape of the rotor blades by means of additive manufacturing techniques, for example, three-dimensional printing.

This production method allows to efficiently produce an optimum turbine rotor.

According to a third aspect of the invention, a device and a method is provided for controlling a water turbine assembly according to the first aspect of the invention, when coupled to an electrical generator and associated control unit. It is clear that the electrical generator may be coupled to the rotor of the water turbine by means of a shaft or other suitable mechanical coupling. Alternatively, the generator may also be integrated into the water turbine, wherein, for example, the rotor of the generator is mounted in the turbine rotor and the stator of the generator is mounted in the turbine housing. The control unit of such a coupled generator preferably makes use of an MPPT or Maximum Power Point Tracking algorithm that by means of the control electronics may impose a variable load to the generator, and thus also the turbine rotor. By means of these variable load and speed of rotation of the turbine rotor, the impact velocity of the water flow on the turbine rotor can be controlled, and for the turbine rotor virtual, variable blade angles for the fixed turbine blades may be set, as it were.

This allows to further optimize the efficiency for the generation of electrical energy by means of the water turbine assembly. Preferably by making use of control electronics and/or software. Preferably the generator is integrated into the hub, the corresponding larger diameter of the hub then allows for a reduced use of the slow speed central part of the vortex, thereby increasing efficiency. Preferably, such a generator is a low rotational velocity generator. Alternatively or optionally the generator could comprise or be coupled to a suitable transmission.

According to a fourth aspect of the invention some embodiments of the previous aspects of the invention could also be applied in a more general for different embodiments of a vortex water turbine assembly. For this object, a gravitational vortex water turbine assembly according to the fourth aspect of the invention is provided, comprising:

a spiral-shaped vortex basin configured to induce a vortex in a water flow under the influence of gravity, having a substantially vertical central axis, the vortex basin comprising a side wall with a tangential inflow opening for supplying the water flow to the vortex and a bottom with a central outflow opening for discharging the water flow of the vortex, in which the water turbine assembly preferably further comprises:

a water turbine, preferably disposed under the basin, coaxially with the central axis of the vortex, comprising a turbine housing, coupled to the central outflow opening and a turbine rotor.

BRIEF DESCRIPTION OF THE FIGURES

By way of example, some embodiments of the invention will be described with reference to the Figures in which:

FIGS. 15B-22 show further clarifications and/or embodiments of a gravitational vortex water turbine assembly.

DETAILED DESCRIPTION OF THE FIGURES

Figure 2:
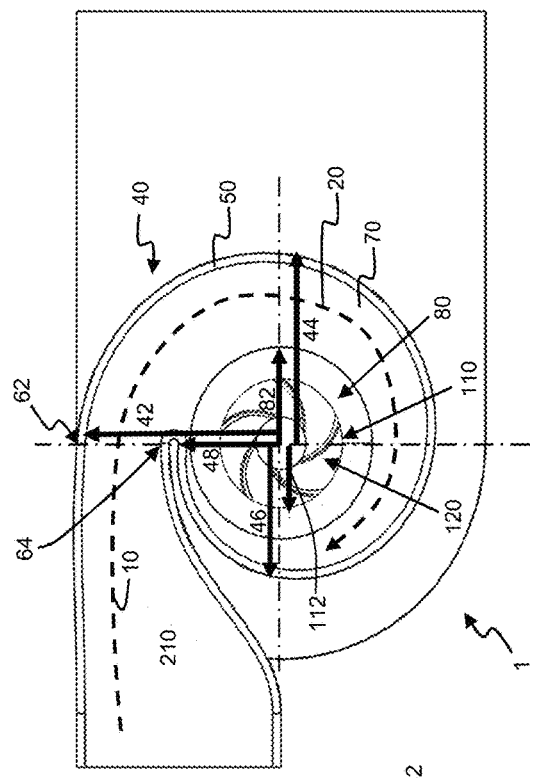
FIG. 2 schematically shows a top view of the embodiment of FIG. 1.
Figure 4:
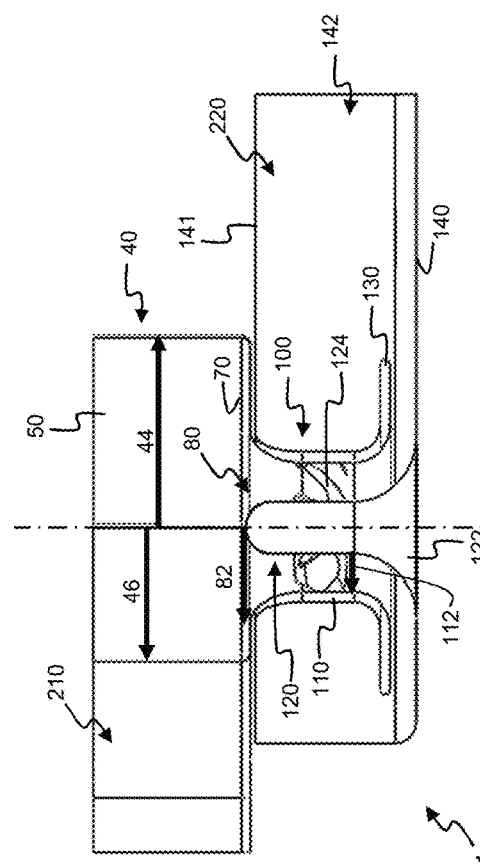
FIG. 4 schematically shows a partial cross-section in a side view of the embodiment of FIG. 1.

FIGS. 1 to 4 schematically show a gravitational vortex water turbine assembly 1 according to a first embodiment of the present invention. The water flow 10 enters the assembly 1 via the inlet 210. This inlet is therefore preferably as far as possible oriented in the upstream direction such that a maximum amount of water can flow through the inlet 210 into the assembly 1. The inlet 210 then guides the water 10 to the inflow opening 60 which forms the transition between the inlet 210 and the spiral-shaped vortex basin 40. In this basin 40, the actual vortex 20 is induced around the vertical central axis 22.

The upright sidewall 50 of the spiral-shaped basin 40 starts at the outside or first side 62 of the inlet 210 near the inflow opening 60. From this side 62 the side wall further extends around the central axis 22 up to the inner or second side 64 of the inlet 210 near the inflow opening 60. For an optimal formation of the vortex 20, the spiral-shaped side wall 50 preferably extends around the central axis 22 at an angle in the range of 330° to 390°.

The outer side 62 and, consequently, the inflow opening 60 preferably tangentially connects to side wall 50. As a result, the incoming water flow 10 through the inflow opening 60 near the side wall will flow substantially tangentially into the spiral-shaped basin 40. With other words, the water flow 10 near the inflow opening 60 will follow the inner wall of the side wall 50. In order to achieve this, the angle between the plane of the outer side 62 and the plane of the inside of the side wall 50 near the inflow opening 60 is in the range of 0° to 20°.

Due to the spiral-shaped shape and the connection of the side wall with both the outer side 62 and the inner or second side 64 of the inlet 210 to the inflow opening 60 the distance between the central axis 22 of the induced vortex 22 and the side wall 50 will decrease gradually. With other words, the side wall 50 will describe in the downstream direction a curve with decreasing radius. Near the first side 62 or at 0° of range the radius 42 will be at a maximum. After this, the radius will gradually decrease to radius 44 at 90°, to radius 46 at 270° and, finally, to radius 48 at 360° at the inner side 64 near the inflow opening 60. The ratio between the maximum radius 42 and the minimum radius 48 defines thereby the size of the inflow opening 60 relative to the basin 40. This ratio is important for the overall efficiency of the assembly 1 and therefore, preferably, the minimum radius 48 is in the range of 50% to 85% of the maximum radius 42.

Furthermore, the side wall 50 may describe a spiral. Preferably, this is a logarithmic spiral or Archimedes spiral. In this manner, the efficiency of the induced vortex 20 is increased while the shape of the side wall is easy to dimension.

The side wall 50 may further consist of one piece, or alternatively may comprise a plurality of segments. This allows to alter the course of the side wall 50 during or after the construction of the assembly 1 taking into account the specific parameters of the water flow 10, such as, for example, the flow rate, the height difference, etc.

The basin 40 further comprises an outflow opening 80 for discharging the water flow 10 of the vortex 20. This opening 80 is applied circular-shaped to the bottom 70 of the basin 40. Hereby, the central point of the opening coincides with the central axis 22. The radius 82 of the opening 80 is furthermore smaller than the minimum radius 48.

A water turbine 100 is coupled under the opening 80, connecting to the bottom 70 of the basin. This turbine 100 further comprises a turbine housing 110 that guides the water flow 10 downwards. The turbine housing 110 has a circular shaped cross-section which may vary across the height of the housing. At the top of the housing 110, the radius of the circular cross-section corresponds to the cross-section of the outflow opening 80 and therefore to radius 82. The central axis of the turbine housing 110 further corresponds to the central axis 22. The turbine 100 further also comprises a rotor 120 coaxial with the central axis 22 which is mounted inside the turbine housing 110. This rotor 120 comprises a central hub 122 with rotor blades 124 coupled therewith. When the water flow 10 is guided through the opening 80, it will continue to be guided through the turbine housing along the rotor blades 124. Due to the tangential movement, the downward or axial movement and the radial movement of the vortex 20 on the rotor blades 124, will rotate the rotor 120. The central hub 122 is rotatably mounted in the water turbine and is further coaxially mounted with the central axis 22 of the vortex 20. This means that the axis of rotation 22 of the hub of the turbine rotor substantially coincides with the central axis 22 of the vortex 20. The axis of rotation of the turbine rotor is substantially vertical.

Near the rotor blades 124, the inner radius 112 of the horizontal cross-section of the turbine housing is preferably in a range of 20% to 45% of the maximum radius 42. In this manner, near the outflow opening 80, and subsequently in the water turbine 100 which connects to this outflow opening, the portion of the vortex 20 is increased with a maximum angular velocity. Such a vortex comprises a core zone, in which the angular velocity of the water flow 10 linearly increases to a determined maximum angular velocity at an increase of the distance to the central axis 22, after which, outside of this core zone, the angular velocity decreases again at an increase of the distance from the central axis 22. With such a range for the radius 82 of the central outflow opening and the connecting radius 112 of the inner wall of the turbine housing 110, the portion of the core zone of the vortex 20 is maximized near the turbine rotor 120. A limited exceeding of the core zone, for example with a maximum of 20% may be desirable, but too large an exceeding delivers a water flow 10 having a decreasing angular velocity that negatively influences the efficiency of the turbine rotor 120.

The assembly 1 further comprises a downstream diffuser 130. This diffuser is located below the rotor blades 124 and has the function to guide the water flow 10 radially away from the central axis 22 to the outlet 220. The turbine 100 and diffuser 130 are completely surrounded by the outlet 220. Outlet 220 comprises a bottom 140 at the underside of the turbine rotor 120. The top 141 of outlet 220 is located near the opening 80 and the underside of the bottom 70 of the basin 40. As a result, the water flow 10 can rise back up to the level of the outflow opening 80 after leaving the diffuser 130. Outlet 220 further includes an output 142 because the side wall of the outlet 220 is open to one side. The opening 142 is located on the downstream side, i.e., on the opposite side of the inlet 210, and thus of the inflow opening 60.

Without diffuser 130, the water flow 10 could leave the water turbine 100 in a turbulent manner. This turbulent flow can, however, already occur near the rotor blades 124, and thus disturb the flow in the water turbine 100 itself. Due to the diffuser, the water flow is first guided away in a non-turbulent manner from the water turbine such that the risk of turbulence in the water turbine 100 itself is minimized. Moreover, such a diffuser 130 creates a certain axial counter-pressure in the water turbine, thus reducing the risk of damage to the water turbine 100 by cavitation is reduced.

Figure 11:
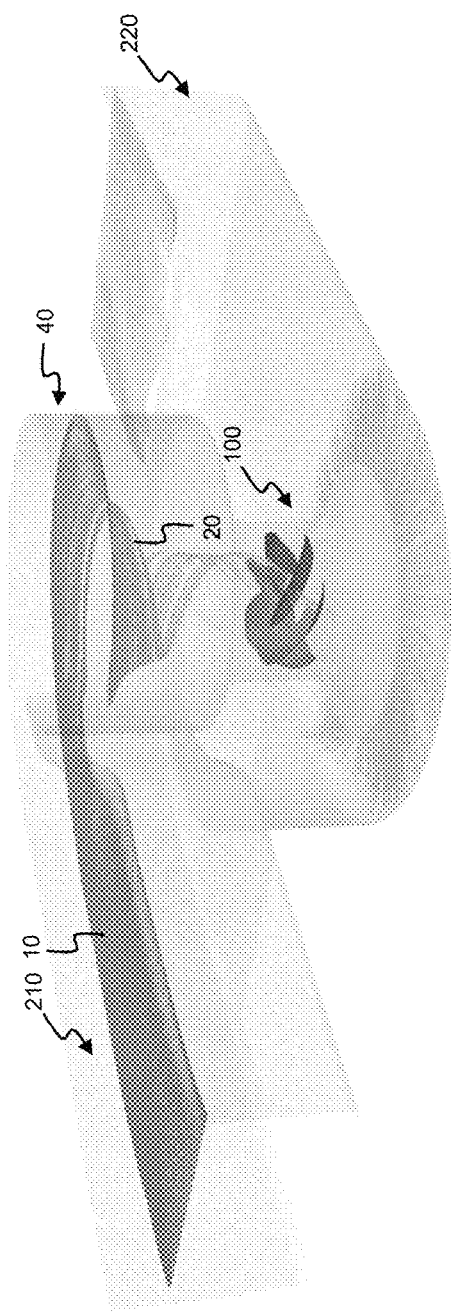
FIG. 11 schematically shows the course of the water flow and the vortex for a water turbine assembly according to an embodiment of FIGS. 1 to 4.

FIG. 11 illustrates the water flow 10 in the assembly 1 according to the above embodiment. The water flow 10 enters the assembly 1 through the inlet 210 where it is guided to the basin 40. In the basin, the vortex 20 is then induced by guiding the water flow 10 into the spiral-shaped basin. At the bottom of the basin, the water flow then enters the water turbine 100 where the axial, radial and tangential component of velocity of the water flow 10 relative to the rotor induces the rotor to rotate. When the water flow 10 has passed the rotor, it arrives at the bottom of the assembly after which it is guided laterally through the diffuser to the outlet 220. The water flow 10 finally exits the outlet 220.

Figure 5:
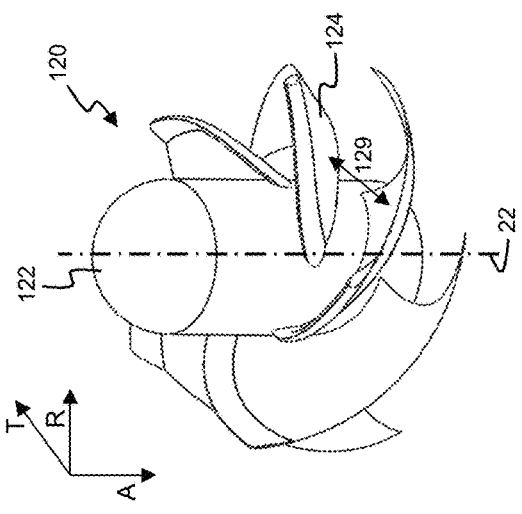
FIGS. 5 to 7 respectively schematically show a top view, side view and perspective view of an embodiment of a turbine rotor for use in a water turbine assembly.
Figure 7:
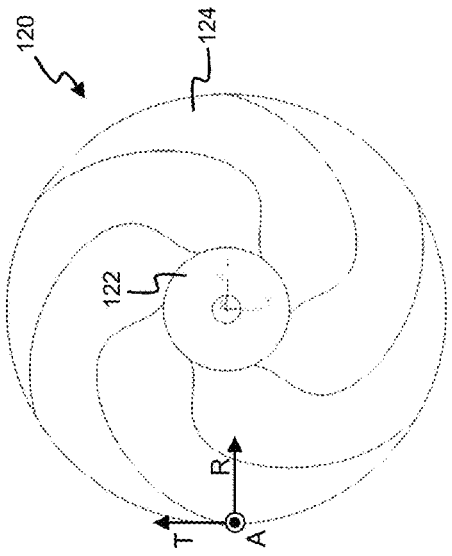
Figure 6:
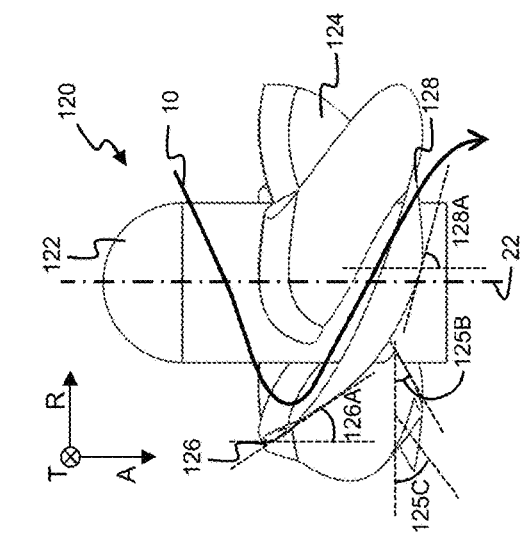
Figure 8:
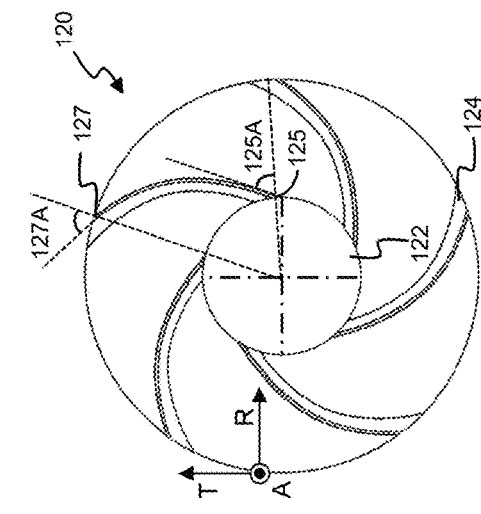
FIGS. 8 and 9 respectively schematically show a side view and a top view of an alternative embodiment of a turbine rotor.
Figure 9:
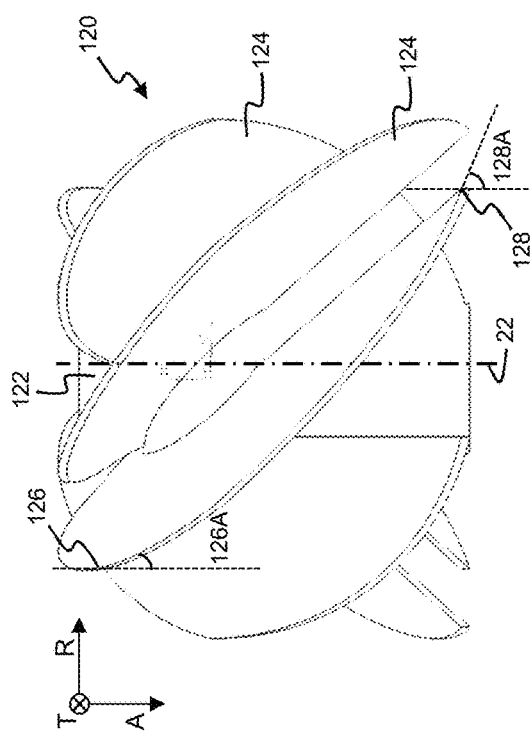

FIGS. 5 to 7 schematically show respectively a top view, side view and perspective view of the turbine rotor 120 for use in the assembly 1 according to a first embodiment of the present invention. FIGS. 8 and 9 schematically show respectively a side view and top view of the turbine rotor 120 for use in the assembly 1 according to a second embodiment of the present invention. Both of these embodiments are described together below.

Rotor 120 comprises a central hub 122 which is rotatably mounted around the central axis 22 in the turbine housing 110. Five rotor blades 124 are mounted onto the hub 122. The number of rotor blades is not limited to five, but is preferably in the range of two to ten, inclusive. By limiting the number of rotor blades the distance 129 between the rotor blades 124 may be kept sufficiently large. In this manner, for example, fish can pass through the rotor if they are smaller than the distance 129 and a fish-friendly water turbine is thus obtained. Furthermore, the water turbine is therefore also less sensitive to disturbance by pollution and silting. This effect can be further enhanced by the turbine rotor 120 to rotate at a relatively low rotational speed such as, for example, 300 revolutions per minute or less, for example, 100 revolutions per minute or less.

The rotor blades 124 are positioned on the rotor hub 122 such that they absorb the tangential, axial and radial component of the water stream 10 of the vortex 20, i.e., that the rotor 120 starts to rotate and thus experiences a torque by the action of each of these components. The direction of these components is indicated in each of FIGS. 5 to 7, wherein T stands for the tangential component, for the radial component R and A for the axial component. Known gravitational vortex water turbine assemblies, wherein the turbine rotor is positioned in the basin, make use of vertical rotor blades. In this manner, only the tangential component of the water flow of the vortex is captured by the rotor blades. The axial and radial component of the water flow of the vortex is not disturbed in such known systems to minimize the risk that the vortex is disturbed in the basin. This embodiment, wherein the water turbine is positioned under the outflow opening in the bottom of the basin, allows to capture all of the components of the water flow of the vortex near the water turbine, without the risk that the vortex in the basin is disturbed. This allows energy to be extracted from the water flow through the turbine rotor with greater efficiency.

Rotor blade 124 comprises an upstream end or side 126, i.e., the upper side of the rotor blade since in operation the upper or upstream side 126 first comes into contact with the water flow 10 from the vortex 20. This is schematically shown in FIG. 6 where the relative movement of the water flow 10 relative to the rotor blade is shown. The water flow 10 then leaves the rotor blade 124 along the side 128, i.e., the downstream side or lower side or end 128 at the bottom of the rotor blade 124. The placement of these two sides then determine the extent to which the energy of the axial velocity component of the water flow will be converted in a movement of the rotor 120. The positioning of the sides 126 and 128 is characterized by the smallest respective angle 126A and 128A between the central axis 22 and the plane tangent to the respective side 126 and 128. For an optimum conversion of the axial velocity component, the angle 126A at the upstream end or side 126 is preferably smaller than the angle 128A on the downstream end 128. Preferably, the angles are further selected such that, at the nominal rotational speed of the rotor, the radial velocity component of the water flow 10 is optimally engaging the rotor blade 124. This may be, for example, when the angle 126A at the upstream end 126 is in the range of 0° to 45° and when the angle 128A at the downstream end 128 is in the range of 45° to 80°.

The placement and shape of the rotor blade 124 is further determined by the angles 125A and 127A. Angle 125A is the angle between a vertical plane tangent to the radially inward end 125 of the rotor blade 124 and a plane through the central axis 22 and through this radially inward end 125. The radially inward end is thereby the position where the rotor blade is attached to the central hub 22. Angle 127A is the angle between a vertical plane tangent to the radially outward end 127 of the rotor blade 124 and a plane through the central axis 22 and through this radially outward end 127. Preferably, the angle 125A is greater than the angle 127A in order to achieve an optimal impact of the water flow 10 on the turbine blades. With other words, the radially inward end 125 has such a greater angle 125A with respect to a plane according to the central axis 22 than at the radially outward end 127.

Finally, the placement and shape of the rotor blade 124 is also determined by the angles 125B and 125C. Angle 125B is the angle between the radially inward end 125 of the rotor blade 124 and a plane perpendicular to the central axis 22 and through this radially inward end 125. Hence, angle 125C is the angle between the radially outward end 127 of the rotor blade 124 and a plane perpendicular to the central axis 22 and through this radially outward end 127. Preferably, the angle 125C is larger than the angle 125B in order to achieve an optimal impact of the water flow 10 on the turbine blades. With other words, the radially inward end 125 has a smaller angle 125B with respect to a plane perpendicular to the central axis 22 than at a radially outward end 127.

According to an embodiment of the invention, the following method may be provided in the turbine rotor 120. In a first step, a simulation of the created vortex 20 is carried out in the assembly 1. In this simulation, the rotor 120 is still not present such that the vortex 20 can flow freely through the water turbine. An example of a graphical result of such a simulation is shown in FIG. 11. The rotor is shown in an illustrative way, but it does not interact with the water flow 10. In a next step, the axial, tangential and radial components of the vortex 20 near the rotor blades 124 in the water turbine 100 are determined. Subsequently, on the basis of these components, the rotor blades are generated in such a manner that a minimal boundary layer separation of the water flow 10 is created near the rotor blades. Since all necessary parameters are known, the generation of the shape of the rotor blades may occur completely automatically. Finally, the rotor blades are manufactured. This may be done efficiently using additive manufacturing techniques, such as, for example, three-dimensional printing. Using the above steps, a turbine rotor 120 may be dimensioned and produced in an efficient manner.

Figure 13:
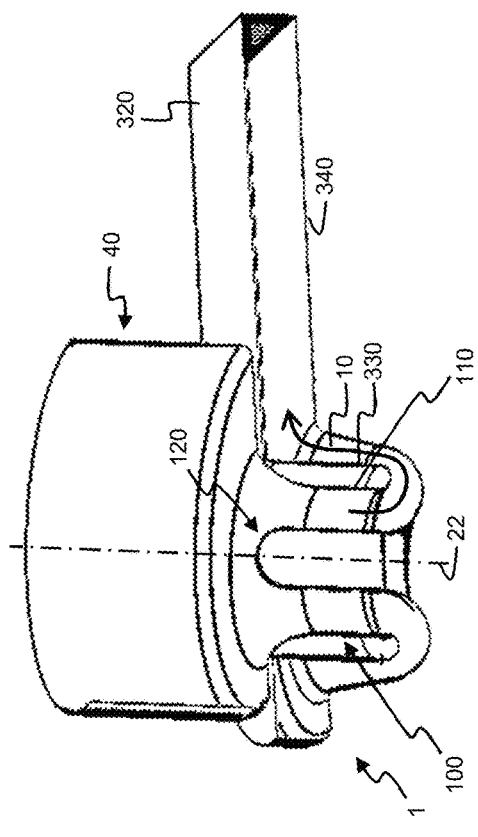
FIGS. 12 and 13, respectively show a side view and a cross-section in side view of an alternative embodiment of a water turbine assembly.
Figure 12:
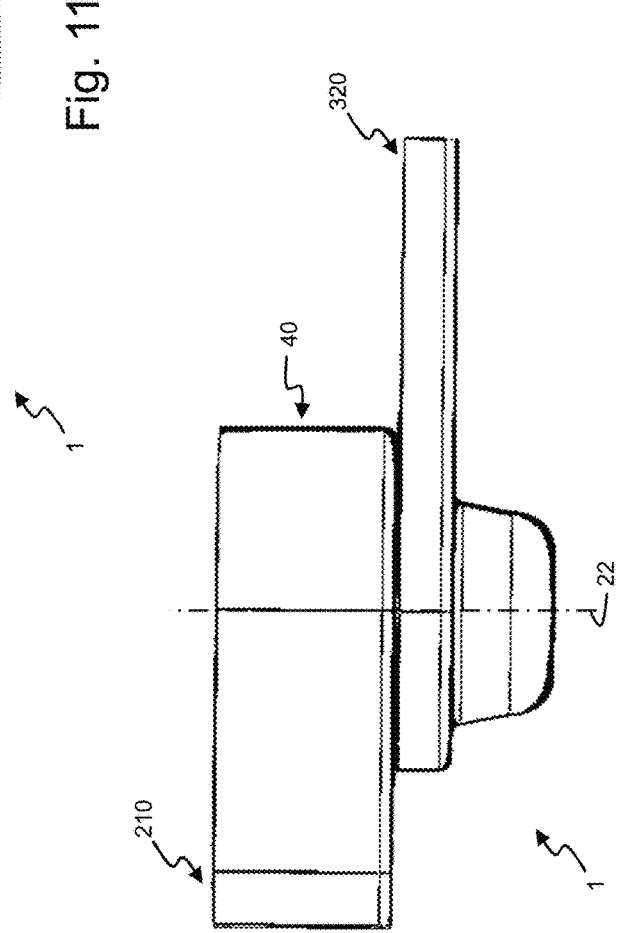

FIGS. 12 and 13 show respectively a side view and a cross section in side view of an alternative embodiment of the water turbine assembly according to the embodiment of FIGS. 1 to 4. Inlet 210, basin 40 and water turbine 100 are herein constructed in the same manner. The diffuser 330 and outlet 320 have an alternative configuration. The diffuser 330 is configured such that the water flow 10 is first guided away radially from the rotor 120 and is then axially from the lowest position forced back upwards towards the outlet 320. As a result, the bottom 340 of the outlet 320 is positioned higher than the position of the water flow 10 when it has passed the rotor 120. Because the water flow 10 is to be forced back upwards, in this manner a constant and higher axial counter-pressure is created which reduces the risk of cavitation, as well as a turbulent disturbance of the flow in the water turbine. Furthermore, such an embodiment also ensures that, even when the outflow opening of the water turbine would be located above the water surface, that the risk is reduced that an airflow through this outlet opening of the water turbine would mix with the water flow, which would reduce the efficient operation of the water turbine 100.

Figure 10:
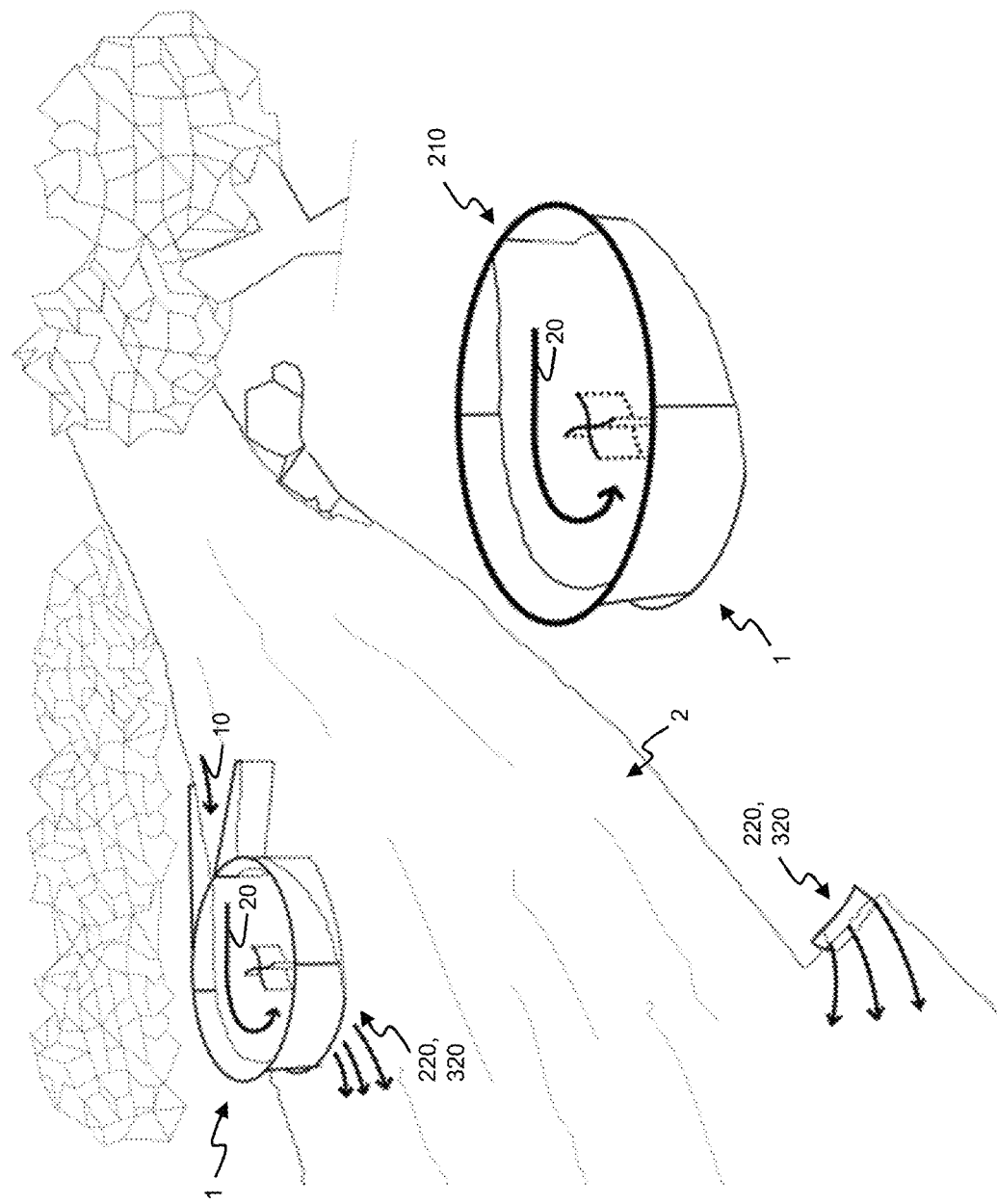
FIG. 10 schematically shows an installation of water turbine assemblies in or near a watercourse.

FIG. 10 schematically illustrates an installation of the water turbine assemblies 1 in or near a watercourse 2. In an initial installation option, the assembly 1 is placed in the river 2. The inlet 210 is thereby directed upstream such that the water flow 10 can flow into the basin where the vortex 20 is induced. The outlet 220 or 320 is located below the water surface and is directed downstream such that the water flow 10 can flow with the flow of the river 2 out of the outlet 220, 320. According to a further embodiment, there is provided a water turbine assembly, characterized in that the water turbine is located at its downstream end under the water surface. In this manner, the pressure in the water flow 10 near the water turbine 100 is maintained and there is no risk that an air flow mixes with the outflowing water, which could lead to a decrease in the efficiency of the system. This embodiment has the advantage that the installation thereof can be done relatively easy without a lot of earthmoving. It is surely sufficient to provide an adequate foundation in the watercourse 2 and anchor the assembly thereon.

In a second installation option, the assembly is embedded in the bank alongside the watercourse 2. To guide the water flow 10 up to the inlet 210, a portion of the watercourse 2 is artificially branched off and guided to the inlet 210. The basin 40 itself is then partially elaborated above ground while the water turbine 100 is embedded underground. The assembly is further elaborated such that the outlet 220 or 320 discharge further downstream into the watercourse 2. Again, the outlet 220 or 320 is preferably positioned under the water level of the watercourse 2. This embodiment requires more earthmoving and space than the first embodiment, but has the advantage that it is not subjected to the external forces of the watercourse 2. Hence, the assembly 1 needs to be dimensioned less firmly.

An advantage with the installation of assembly 1 according to the embodiment, illustrated in FIGS. 1 to 4, is that the bottom 140 of the outlet 220 and hence, of the assembly 1 is flat. Hence, it is sufficient to provide a flat foundation on which the assembly can then be mounted. This is particularly advantageous when the assembly 1 is installed in the watercourse because providing under water a recess for diffuser 330 is more complex than with a flat base plate 140.

According to a further embodiment, the maximum radius 42 is in the range of 1.5 m to 10 m, inclusive. Such a water turbine assembly is compact and can be installed without major work in, near, or in the vicinity of an existing watercourse.

The following dimensions can be used, for example, for the second embodiment of the assembly 1 according to FIGS. 12 and 13:
- a height of 1500 mm for the basin 40 and thus also for the inlet 210.
- a width of 2000 mm at the entrance of the inlet 210.
- a width of 700 mm at the inflow opening 60, i.e., the difference between the radius 42 and 48 is 700 mm.
- a largest diameter of the basin 40 of 3600 mm, the distance of the 1st side 62 along the radius 42 to the opposite side of the basin is 3600 mm.
- the inner radius 112 of the turbine housing is 600 mm.
- the diameter of the rotor hub 122 near the rotor blades 124 is 480 mm.
- the total height of the assembly 1 is 2862 mm, i.e., from the top of the basin 40 to the bottom of the diffuser 330.
- the height of the outlet 320 is 450 mm and the width of the outlet 320 is 3000 mm.

In this manner, the water undergoes a total height difference of 500 mm. With such dimensions, one is able to realize a water turbine assembly wherein the total generated nominal electrical power of this assembly 1 may be 10 kW or more. In order to realize such a generated electrical power using known gravitational vortex water turbine assemblies, dimensions should be used, in particular for the basin, which are, in general, a multiple of the dimensions mentioned above.

Figure 14:
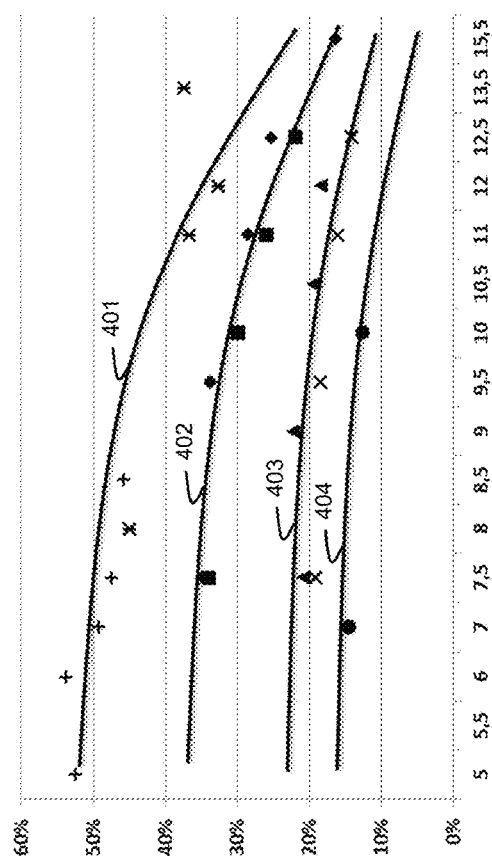
FIGS. 14 and 15A schematically show a comparison of the efficiency and the power of various embodiments of the invention with respect to known water turbine assemblies.

FIG. 14 illustrates the simulated efficiency of different turbine assemblies as function of the flow rate. The flow rate is expressed in cubic meters per second. The efficiency is a percentage, determined in a test arrangement wherein the power that was used by a pump to generate a water flow with a particular flow rate, which was controlled by the inflow opening in a tested embodiment of the gravitational vortex water turbine, was compared with the power generated by an electrical generator coupled to the turbine rotor. Curve 401 corresponds to an assembly 1 according to the embodiment as illustrated in FIGS. 1 to 4, wherein use is made of a spiral-shaped basin. Curve 404 shows, for comparison, the efficiency of a known turbine assembly with a known turbine rotor having vertical turbine blades. Curves 402 and 403 show, respectively, the relative increase of the efficiency due to the use of the optimized turbine rotor according to the embodiment of, on the one hand, FIGS. 1 to 7, and on the other hand, FIGS. 8 and 9.

Figure 15A:
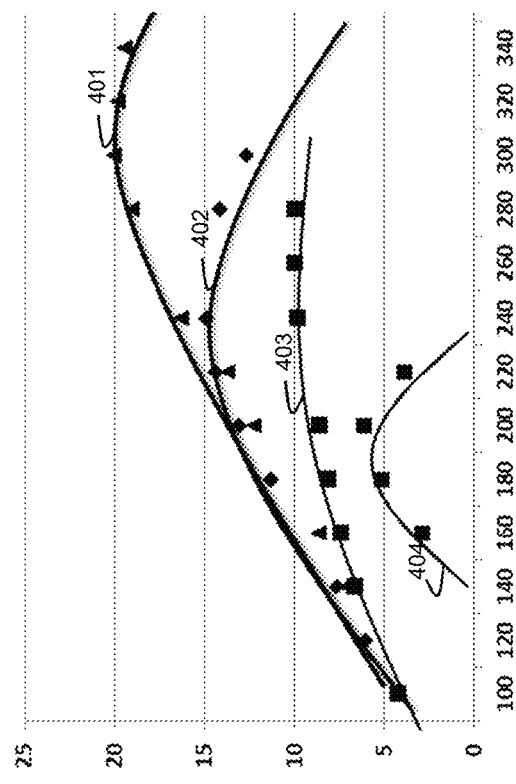

FIG. 15A illustrates the nominal power of a water turbine assembly as function of the rotational speed of the rotor 120. The rotational speed is expressed in terms of the number of revolutions per minute (RPM) and the power is expressed in kilowatt (kW). Curve 501 corresponds to an assembly 1 according to the embodiment as illustrated in FIGS. 1 to 7, wherein use is made of a spiral-shaped basin. Curve 504 shows, by way of comparison, the generated power of a known turbine assembly with a known rotor turbine having vertical turbine blades. Curves 502 and 503 show, respectively, the relative increase in the efficiency due to the use of the optimized turbine rotor according to the embodiment of, on the one hand, FIGS. 1 to 7, and on the other hand, FIGS. 8 and 9.

Furthermore, it is also clear that the above described embodiments of the water turbine assembly can be coupled to an electrical generator and that this electrical generator can be controlled by means of an associated control unit. The electrical generator may be coupled, for example, to the turbine rotor of the water turbine by means of a shaft or any other suitable mechanical coupling. Alternatively, the generator may also be integrated into the water turbine. In such an embodiment, for example, the rotor of the generator rotor is mounted in the turbine rotor and the stator of the generator in the turbine housing. The control unit of such a coupled generator preferably makes use of an MPPT or Maximum Power Point Tracking algorithm that may impose, by means of the control electronics, a variable load onto the generator, and thus also onto the turbine rotor. By means of this variable load and rotational speed of the turbine rotor, the impact velocity of the water flow on the turbine rotor can be controlled, and for the turbine rotor virtual, variable blade angles for the fixed turbine blades may be set, as it were. This allows to further optimize the efficiency to generate electrical energy by the water turbine assembly.

It is further apparent that both at the design of the water turbine assembly and at the controlling thereof, it is desired to limit the maximum relative velocity difference between the turbine blades and the water flow in the vortex during operation of the water turbine assembly. This may be realized, for example, by controlling the water turbine assembly such that the maximum relative velocity difference between the turbine blades and the water flow in the vortex does not exceed a predetermined maximum value during operation of the water turbine assembly. This predetermined maximum value may be determined, for example, in function of bioparameters, such that, for example, fish survival can be ensured. This predetermined maximum value, for example, amounts to a value in the range of 0.5 m/s to 5 m/s, for example, 1 m/s.

Figure 1:
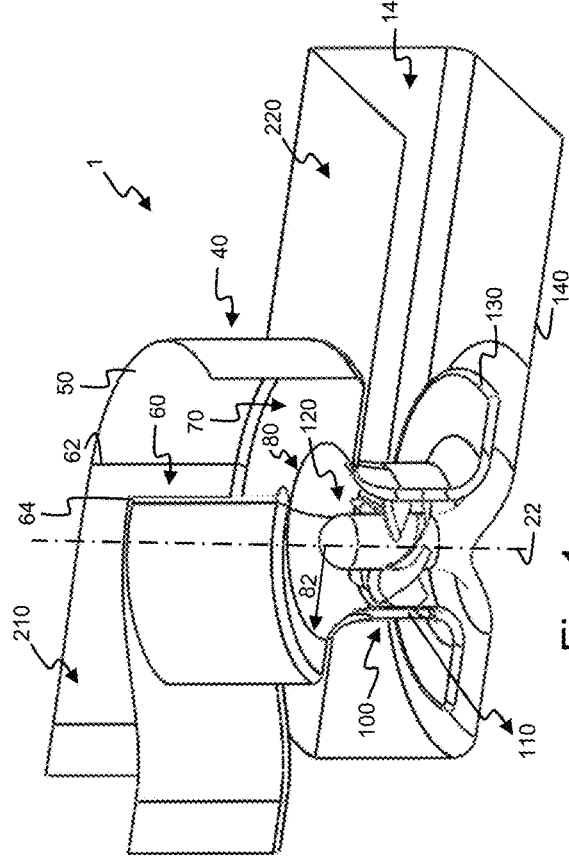
FIG. 1 schematically shows a partial cross-section in a perspective view of an embodiment of a gravitational vortex water turbine assembly.
Figure 3:
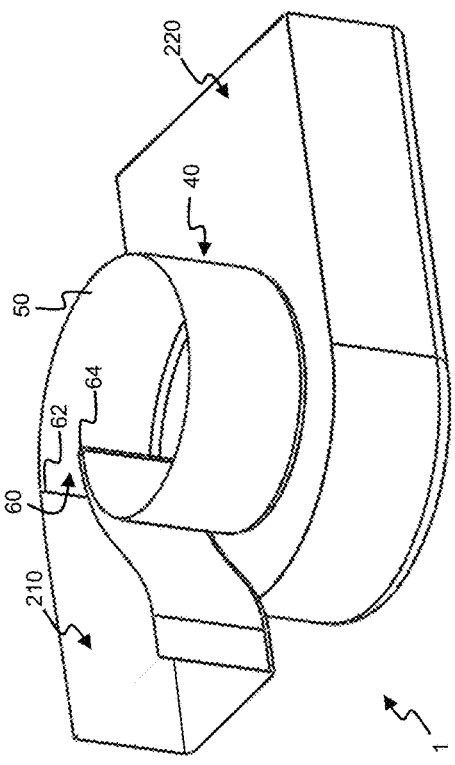
FIG. 3 schematically shows a perspective view of the embodiment of FIG. 1.
Figure 16:
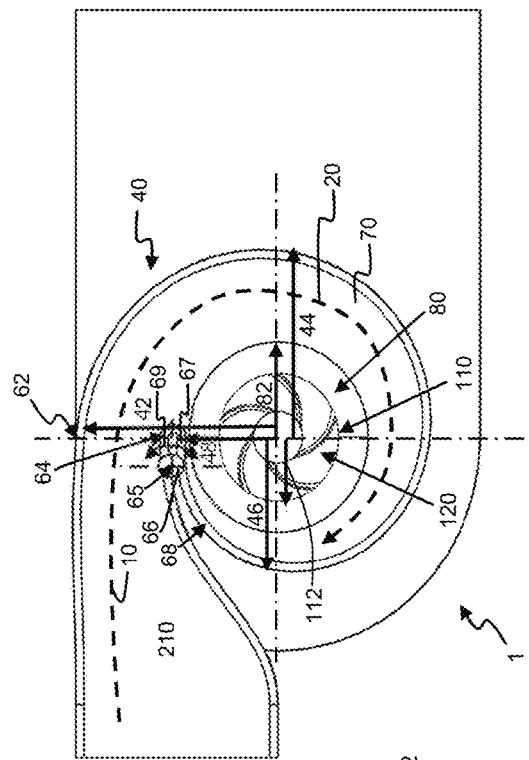
Figure 15B:
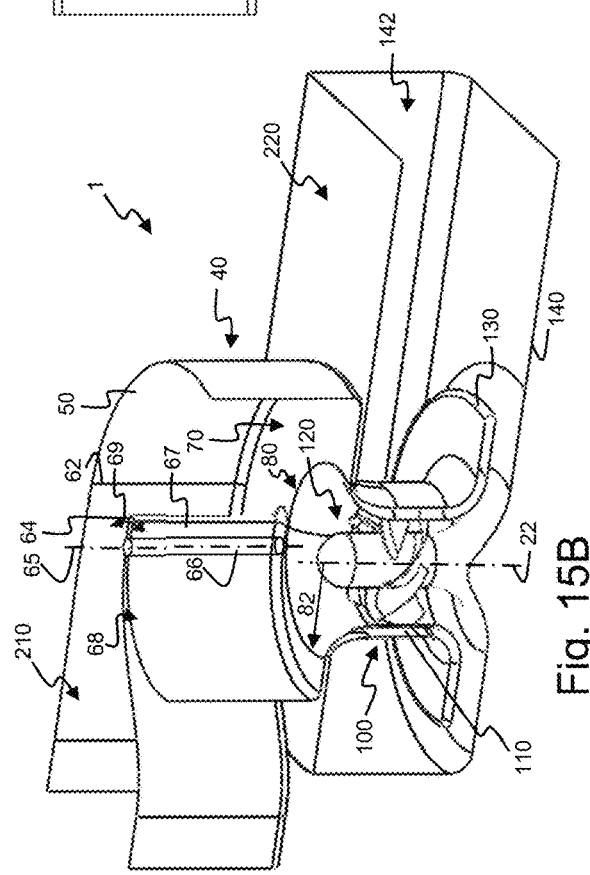

FIGS. 15B and 16 shows an alternative embodiment similar to that detailed in FIGS. 1 and 2. Similar elements comprises similar references and generally function in a similar way as described above. However according to this embodiment the side wall 50 comprises a movable section 67 at the second side 64 of the inlet 210, configured to allow for a modification of the distance 48 between the second side 64 of the inlet 210 and the central axis of the turbine rotor 120, such that the alignment of the central axis of the turbine rotor 120 and central axis 22 of the vortex 20 is modified, preferably such that the alignment of the central axis of the turbine rotor 120 and the central axis 22 of the vortex 20 is increased. It is clear that alternative embodiments are possible, but according to the embodiment shown this is implemented by making the movable section 67 rotatable about a suitable shaft 66 providing for a rotation axis 65 such that the second side 64 of the inlet 210 can be moved along the direction indicated with arrow 69. It is clear that the part 68 of the side wall to which the movable section 67 is rotationally coupled remains stationary. As shown, preferably the rotational axis 65 is parallel with the central rotation axis 22.

Figure 19:
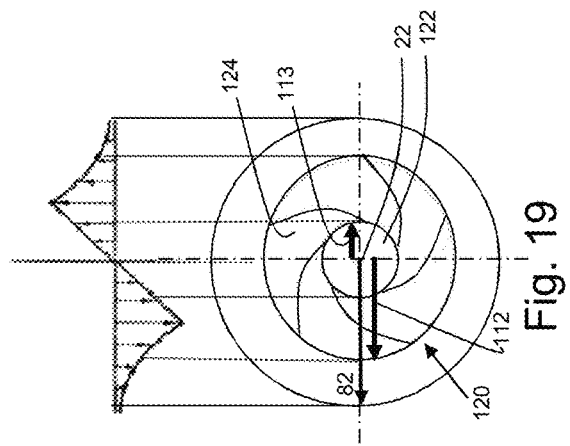
Figure 18:
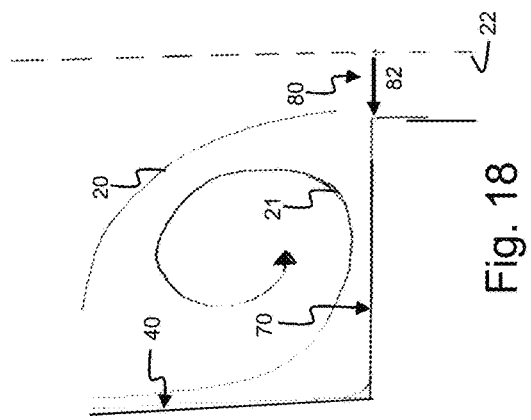
Figure 17:
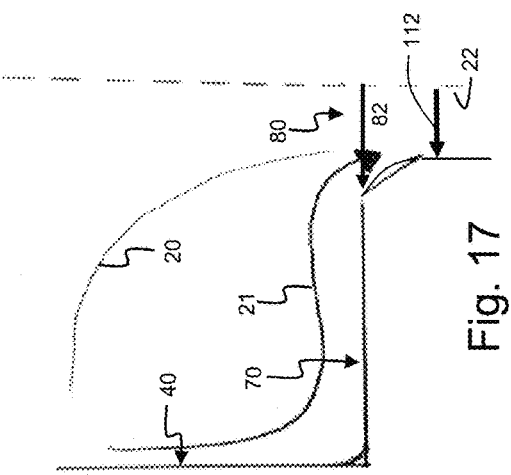

FIG. 19 details an embodiment in which the rotor blades 124 cover an annular section around the central axis 22 of the vortex (20) which does not exceed the core zone of the vortex by more than 25%, and preferably does not exceed the core zone of the vortex by more than 20%. The respective radius 113 of the hub 122, radius 112 of the turbine rotor 120, radius 82 of the turbine housing 110 are shown in relation to the different zones of the speed profile of the vortex 20. As shown, the diameter of the hub 122 covers the low speed core zone of the vortex, the annulus covered by the turbine blades 124 covers the high speed core zone of the vortex which also excludes the low speed exterior zone of the vortex at the annulus between the diameter of the outlet opening and the diameter of the turbine rotor 120.

Figure 21:
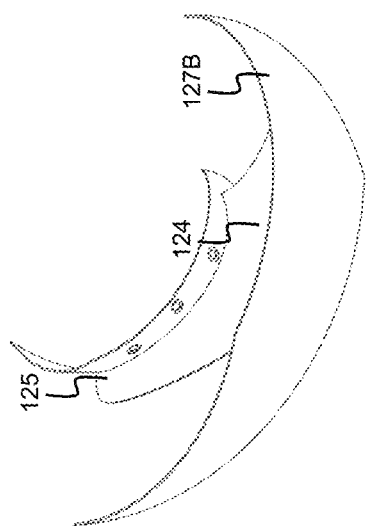
Figure 22:
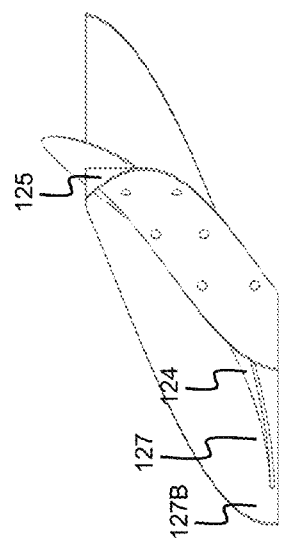
Figure 20:
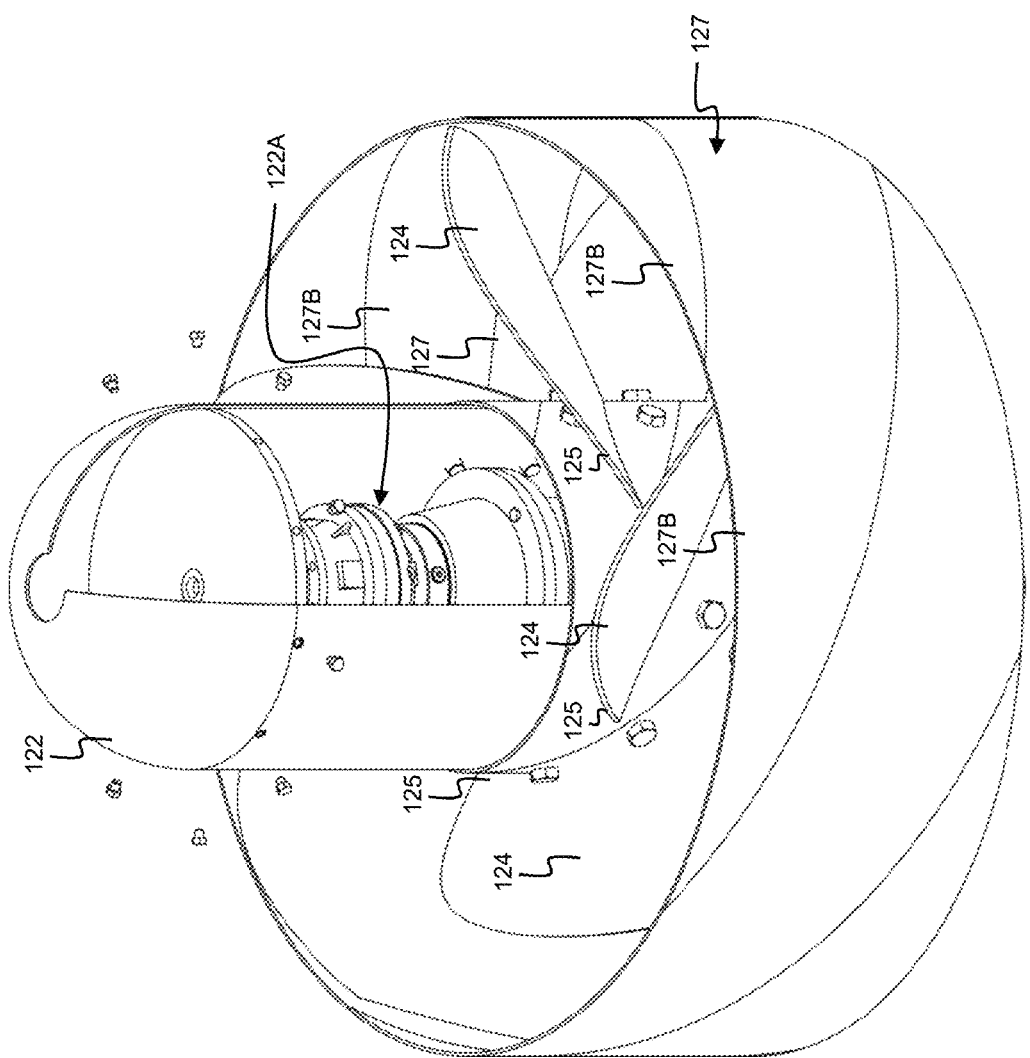

FIG. 20 shows an alternative embodiment of a turbine rotor similar to that described with reference to FIGS. 5 to 7 and similar elements comprise similar references, however this embodiment of the turbine rotor 120 also comprises a radially outward cylindrical shroud 127 coupled to the rotor blades 124, such that the cylindrical shroud 127 is rotated coaxially with the rotor blades 124 during rotation of the turbine rotor 120. FIGS. 21 and 22 show different views of a rotor blade 124, each comprising a respective shroud segment 127B coupled to its radial outer end, such that when all rotor blades 124 are mounted to the central hub 122, the respective shrouds segments 127B are coupled to each other thereby forming the cylindrical shroud 127. Such an embodiment is advantageous as it increases structural rigidity of the turbine rotor, thereby reducing vibrations during operation, especially in the tangential direction. Additionally the cylindrical shroud 127 interacts with the wall of the turbine housing 110 as a sort of labyrinth buffer, in which the enclosed water volume acts similar as a fluid bearing and/or damping element, thereby providing for additional vibration reducing effects. As further shown, according to this embodiment preferably the generator 122A is integrated into the hub 122.

It goes without saying that numerous variations and combinations of the above-described embodiments are possible that are within the scope of protection, as defined by the claims.

The invention claimed is:

1. A gravitational vortex water turbine assembly, comprising:
 a spiral-shaped vortex basin configured to induce a vortex having a substantially vertical central axis in a water flow under the influence of gravity, the spiral-shaped vortex basin comprising a side wall with a tangential inflow opening for supplying the water flow to the vortex and a bottom with a central outflow opening for discharging the water flow of the vortex,
 a water turbine, disposed under the spiral-shaped vortex basin, coaxially with the substantially vertical central axis of the vortex, comprising a turbine housing, coupled to the central outflow opening, and a turbine rotor,
 wherein the turbine rotor comprises a central rotor hub and rotor blades attached thereon, and
 wherein the rotor blades:
 comprise an upstream end at an upper side of the rotor blades and a downstream end at a lower side of the rotor blades, a smallest angle between the substantially vertical central axis and a plane tangent to the upstream end is smaller than a smallest angle between the substantially vertical central axis and a plane tangent to the downstream end;
 at a radially inward end have a larger angle between a vertical plane tangent to the radially inward end and a plane through the substantially vertical central axis and through the radially inward end than an angle at a radially outward end between a vertical plane tangent to the radially outward end and a plane through the substantially vertical central axis and the radially outward end; and
 at the radially inward end have a smaller angle between the radially inward end and a plane perpendicular to the substantially vertical central axis than an angle at the radially outward end between the radially outward end and a plane perpendicular to the substantially vertical central axis and through the radially outward end, such that the rotor blades are configured to absorb the tangential, axial and radial component of the water flow of the vortex.

2. A gravitational vortex water turbine assembly according to claim 1, wherein the side wall extends downstream around the substantially vertical central axis from a first side up to an opposite second side of the tangential inflow opening, wherein a distance between the side wall and the substantially vertical central axis thereby decreases from a maximum radius near the first side to a minimum radius near the opposite second side according to a downstream direction.

3. A gravitational vortex water turbine assembly according to claim 2, wherein the minimum radius is in the range of 50% to 85% of the maximum radius.

4. A gravitational vortex water turbine assembly according to claim 2, wherein a course of the distance between the side wall and the substantially vertical central axis between the maximum radius and the minimum radius occurs according to:
 a logarithmic spiral;
 a Bernoulli spiral;
 a Fibonacci spiral; or
 an Archimedes spiral.

5. A gravitational vortex water turbine assembly according to claim 1, wherein the side wall comprises a plurality of segments.

6. A gravitational vortex water turbine assembly according to claim 2, wherein the central outflow opening has a radius which is smaller than or equal to the minimum radius of the distance between the side wall and the substantially vertical central axis;
 and an inner radius of the turbine housing, near the turbine rotor, is in the range of 20% to 45% of the maximum radius of the distance between the side wall and the substantially vertical central axis.

7. A gravitational vortex water turbine assembly according to claim 1, wherein a downstream end of the turbine housing comprises a diffuser configured to guide the water flow in a direction having a component radially away from the substantially vertical central axis.

8. A gravitational vortex water turbine assembly according to claim 7, wherein the diffuser is further configured to guide the water flow from a lowest position back upwards towards an outlet.

9. A gravitational vortex water turbine assembly according to claim 1, wherein the water turbine is positioned at a downstream end under a water surface.

10. A gravitational vortex water turbine assembly according to claim 1, wherein a number of the rotor blades is in the range of two to ten, inclusive.

11. A gravitational vortex water turbine assembly according to claim 1, wherein the smallest angle between the substantially vertical central axis and the plane tangent to the upstream end is in the range of 0° to 45°, and in that the smallest angle between the substantially vertical central axis and the plane tangent to the downstream end is in the range of 45° to 80°.

12. A gravitational vortex water turbine assembly according to claim 1, wherein the water turbine assembly further comprises:
  an electrical generator, coupled to the water turbine, or mounted in the water turbine;
  a control unit, coupled to the electrical generator, wherein the control unit is configured to control a rotational speed and a load of the electrical generator and the therewith coupled turbine rotor of the water turbine during operation such that:
  a relative maximum velocity difference between the rotor blades and the water flow in the vortex does not exceed a predetermined maximum value.

13. A gravitational vortex water turbine assembly according to claim 1, wherein:
  a radius of the central rotor hub of the turbine rotor is larger than a predetermined minimum radius, the predetermined minimum radius being determined:
  as a percentage in the range of at least 10% of a radius of the turbine rotor and/or of the turbine housing;
  as a percentage in the range of 10% to 65%, for example of the radius of a forced vortex zone of the vortex; and/or
  such that the rotor blades cover an annular section around the substantially vertical central axis of the vortex which does not exceed a core zone of the vortex by more than 25%;
  the gravitational vortex water turbine assembly further comprises an outlet, which is located below a water surface and is directed downstream;
  the radius of the turbine housing is smaller than a maximum radius of the central outflow opening, and preferably a transition between the turbine housing and the central outflow opening comprises a curved shape, such as for example a conical shape or hyperbolical shape with a rounded transition to straight ends; and/or
  the turbine rotor comprises a radially outward cylindrical shroud coupled to the rotor blades, such that the radially outward cylindrical shroud is rotated coaxially with the rotor blades during rotation of the turbine rotor.

14. A gravitational vortex water turbine assembly according to claim 2, wherein:
  the side wall comprises a movable section at a second side of an inlet, configured to allow for a modification of a distance between the second side of the inlet and a central axis of the turbine rotor, such that an alignment of the central axis of the turbine rotor and the substantially vertical central axis of the vortex is modified, such that the alignment of the central axis of the turbine rotor and the substantially vertical central axis of the vortex is increased; and/or
  no intermediate guide vanes are positioned in or upstream of the an inlet opening.

* * * * *